(12) United States Patent  
Manabe et al.

(10) Patent No.: US 7,377,655 B2
(45) Date of Patent: May 27, 2008

(54) PROJECTION TYPE DISPLAY APPARATUS

(75) Inventors: Yuji Manabe, Kamakura (JP); Tetsuo Hattori, Yokohama (JP)

(73) Assignee: Nikon Corporation, Tokyo (JP)

( * ) Notice: Subject to any disclaimer, the term of this patent is extended or adjusted under 35 U.S.C. 154(b) by 159 days.

(21) Appl. No.: 10/886,550

(22) Filed: Jul. 9, 2004

(65) Prior Publication Data
US 2005/0007555 A1    Jan. 13, 2005

(30) Foreign Application Priority Data
Jul. 10, 2003   (JP)   ............. 2003-194976

(51) Int. Cl.
G03B 21/14 (2006.01)
G02F 1/1335 (2006.01)
G02F 1/13363 (2006.01)

(52) U.S. Cl. .................. 353/33; 353/20; 348/752
(58) Field of Classification Search ............ 353/30–33, 353/97, 81, 20; 349/8, 9, 62; 348/756, 757, 348/752
See application file for complete search history.

(56) References Cited
U.S. PATENT DOCUMENTS 6,010,221 A    1/2000   Maki et al. ............... 353/33
6,299,312 B1*  10/2001  Choi et al. ............... 353/31
6,588,905 B2*  7/2003   Sekine ..................... 353/20
6,908,197 B2*  6/2005   Penn ....................... 353/34
2002/0051094 A1* 5/2002  Makita ..................... 348/744
2002/0097382 A1* 7/2002  Suzuki et al. ............. 353/31
2003/0202129 A1 10/2003  Sekine et al. .............. 349/5

FOREIGN PATENT DOCUMENTS

JP    11-38365       2/1999
JP    2000-330196   11/2000
JP    2004-29692    1/2004

* cited by examiner

Primary Examiner—Andrew T Sever
(74) Attorney, Agent, or Firm—Morgan, Lewis & Bockius LLP

(57) ABSTRACT

A projection type display apparatus includes: a reflection type light valve; a polarization beam splitter that emits light obtained through polarization split executed thereat on light from a light source toward the reflection type light valve, analyzes light modulated at the reflection type light valve and includes a light blocking portion disposed near an outer edge of an exit surface through which the analyzed light exits; and a projection lens through which the analyzed light is projected.

11 Claims, 7 Drawing Sheets

PROJECTION TYPE DISPLAY APPARATUS

INCORPORATION BY REFERENCE

The disclosure of the following priority application is herein incorporated by reference:
Japanese Patent Application No. 2003-194976 filed Jul. 10, 2003

BACKGROUND OF THE INVENTION

1. Field of the Invention

The present invention relates to a projection type display apparatus.

2. Description of the Related Art

There are projection type display apparatuses disclosed in the related art in which light from a light source undergoes color separation to be separated into blue color light, red color light and green color light, with each of the different colors of light radiated onto a reflection type light valve disposed in correspondence to the specific color of light via a polarization beam splitter, the individual colors of light modulated at the corresponding reflection type light valves reenter the polarization beam splitters where they are analyzed before they exit the polarization beam splitters and then the different colors of light undergo color composition at a color composition optical system so as to project a full-color image onto a screen through a projection lens (for instance, see Japanese Laid Open Patent Publication No. H 11-38365).

SUMMARY OF THE INVENTION

In the projection type display apparatus disclosed in the example of the related art described above, diffracted light exiting an end of a reflection type light valve enters the polarization beam splitter, is reflected at a side surface of the polarization beam splitter to advance via the color composition optical system and enters the projection lens as a light beam within the NA of the aperture stop in the projection lens, which is projected onto the screen as a ghost image.

According to the 1st aspect of the invention, a projection type display apparatus comprises: a reflection type light valve; a polarization beam splitter that emits light obtained through polarization split executed thereat on light from a light source toward the reflection type light valve, analyzes light modulated at the reflection type light valve and includes a light blocking portion disposed near an outer edge of an exit surface through which the analyzed light exits; and a projection lens through which the analyzed light is projected.

According to the 2nd aspect of the invention, in the projection type display apparatus according to the 1st aspect, it is preferred that the light blocking portion comprises a light absorbing member.

According to the 3rd aspect of the invention, in the projection type display apparatus according to the 1st aspect, it is preferred that the light blocking portion is formed by processing a surface of the polarization beam splitter near the outer edge of the exit surface so as to achieve a light scattering state.

According to the 4th aspect of the invention, in the projection type display apparatus according to the 1st aspect, it is preferred that the light blocking portion is formed by cutting off a corner near the outer edge of the exit surface at the polarization beam splitter.

According to the 5th aspect of the invention, in the projection type display apparatus according to the 4th aspect, it is preferred that a surface of the light blocking portion is processed so as to achieve a light scattering state.

According to the 6th aspect of the invention, a projection type display apparatus comprises: a color separation optical system that executes color separation to separate light from a light source into individual colors of light that are first color light, second color light and third color light; reflection type light valves, each disposed in correspondence to one of the individual colors of light; polarization beam splitters each of which is disposed in correspondence to one of the individual colors of light, outputs light obtained through polarization split executed thereat on a corresponding color of light resulting from the color separation at the color separation optical system toward the reflection type light valve disposed in correspondence to the corresponding color of light, and analyzes light modulated at the reflection type light valve; a color composition optical system that executes color composition of the individual colors of analyzed light; spacer members which are disposed in correspondence to the individual colors of light between the polarization beam splitters and the color composition optical system, with a spacer member disposed for at least one of the individual colors of light having a light blocking portion near an outer edge of an entry surface through which the analyzed light enters; and a projection lens through which light resulting from the color composition is projected.

According to the 7th aspect of the invention, in the projection type display apparatus according to the 6th aspect, it is preferred that the light blocking portion comprises a light absorbing member.

According to the 8th aspect of the invention, in the projection type display apparatus according to the 6th aspect, it is preferred that the light blocking portion is formed by processing a surface of the spacer member near the outer edge of the entry surface through which the analyzed light enters so as to achieve a light scattering state.

According to the 9th aspect of the invention, in the projection type display apparatus according to the 6th aspect, it is preferred that the light blocking portion is formed by cutting off a corner of the spacer member near the outer edge of the entry surface.

According to the 10th aspect of the invention, in the projection type display apparatus according to the 9th aspect, it is preferred that a surface of the light blocking portion is processed so as to achieve a light scattering state.

According to the 11th aspect of the invention, in the projection type display apparatus according to the 6th aspect, it is preferred that: the color composition optical system comprises a first dichroic film that reflects the first color light and a second dichroic film that is disposed substantially orthogonally to the first dichroic film and reflects the second color light; and the projection type display apparatus further comprises a third dichroic film disposed in the spacer member in an optical path of the third color light which reflects the first color light.

According to the 12th aspect of the invention, in the projection type display apparatus according to the 11th aspect, it is preferred that the light blocking portion comprises a light absorbing member.

According to the 13th aspect of the invention, in the projection type display apparatus according to the 11th aspect, it is preferred that the light blocking portion is formed by processing a surface of the spacer member near the outer edge of the entry surface through which the analyzed light enters so as to achieve a light scattering state.

According to the 14th aspect of the invention, in the projection type display apparatus according to the 11th aspect, it is preferred that the light blocking portion is formed by cutting off a corner of the spacer member near the outer edge of the entry surface.

According to the 15th aspect of the invention, in the projection type display apparatus according to the 14th aspect, it is preferred that a surface of the light blocking portion is processed so as to achieve a light scattering state.

According to the 16th aspect of the invention, a projection type display apparatus comprises: a reflection type light valve; a polarization beam splitter that emits light obtained through polarization split executed thereat on light from a light source toward the reflection type light valve, analyzes light modulated at the reflection type light valve and includes an nonreflecting portion disposed at a surface facing opposite an entry surface through which the light from the light source enters; and a projection lens through which the analyzed light is projected.

According to the 17th aspect of the invention, in the projection type display apparatus according to the 16th aspect, it is preferred that the nonreflecting portion is constituted by processing the surface facing opposite the entry surface so as to achieve a light scattering state.

According to the 18th aspect of the invention, in the projection type display apparatus according to the 16th aspect, it is preferred that the nonreflecting portion is constituted as an indented portion formed at the surface facing opposite the entry surface.

According to the 19th aspect of the invention, in the projection type display apparatus according to the 16th aspect, it is preferred that the nonreflecting portion is constituted with a light absorbing member disposed at the surface facing opposite the entry surface.

According to the 20th aspect of the invention, a projection type display apparatus, comprises: a color separation optical system that executes color separation to separate light from a light source into individual colors of light that are first color light, second color light and third color light; reflection type light valves, each disposed in correspondence to one of the individual colors of light; polarization beam splitters each of which is disposed in correspondence to one of the individual colors of light, outputs light obtained through polarization split executed thereat on a corresponding color of light resulting from the color separation at the color separation optical system toward the reflection type light valve disposed in correspondence to the corresponding color of light, and analyzes light modulated at the reflection type light valve; a color composition optical system that comprises a first dichroic film that reflects the first color light and a second dichroic film that is disposed substantially orthogonally to the first dichroic film and reflects the second color light and executes color composition of the individual colors of analyzed light; spacer members which are disposed in correspondence to the individual colors of light between the polarization beam splitters and the color composition optical system, with a spacer member disposed for at least one of the individual colors of light having a light blocking portion near an outer edge of an entry surface through which the analyzed light enters; a third dichroic film disposed in the spacer member in an optical path of the second color light which reflects the first color light; and a projection lens through which light resulting from the color composition is projected.

According to the 21th aspect of the invention, in the projection type display apparatus according to the 20th aspect, it is preferred that the light blocking portion comprises a light absorbing member.

According to the 22th aspect of the invention, in the projection type display apparatus according to the 20th aspect, it is preferred that the light blocking portion is formed by processing a surface of the spacer member near the outer edge of the entry surface through which the analyzed light enters so as to achieve a light scattering state.

According to the 23th aspect of the invention, in the projection type display apparatus according to the 20th aspect, it is preferred that the light blocking portion is formed by cutting off a corner of the spacer member near the outer edge of the entry surface.

According to the 24th aspect of the invention, in the projection type display apparatus according to the 20th aspect, it is preferred that a surface of the light blocking portion is processed so as to achieve a light scattering state.

According to the 25th aspect of the invention, in the projection type display apparatus according to the 20th aspect, it is preferred that there is further provided halfwave phase plates that are disposed in correspondence to the individual colors of light between the polarization beam splitters and the color composition optical system, and the analyzed light enters the color composition optical system as S polarized light.

According to the 26th aspect of the invention, a projection type display apparatus, comprises: a color separation optical system that executes color separation to separate light from a light source into individual colors of light that are first color light, second color light and third color light; reflection type light valves, each disposed in correspondence to one of the individual colors of light; polarization beam splitters each of which outputs light obtained through polarization split executed thereat on a corresponding color of light resulting from the color separation at the color separation optical system toward the reflection type light valve, analyzes light modulated at the reflection type light valve, and includes an nonreflecting portion disposed at a surface facing opposite an entry surface through which the light from the light source enters; a color composition optical system that comprises a first dichroic film that reflects the first color light and a second dichroic film that is disposed substantially orthogonally to the first dichroic film and reflects the second color light and executes color composition of the individual colors of analyzed light; spacer members which are disposed in correspondence to the individual colors of light between the polarization beam splitters and the color composition optical system; a third dichroic film disposed in the spacer member in an optical path of the second color light which reflects the first color light; and a projection lens through which light resulting from the color composition is projected.

According to the 27th aspect of the invention, in the projection type display apparatus according to the 26th aspect, it is preferred that the nonreflecting portion is constituted by processing the surface facing opposite the entry surface so as to achieve a light scattering state.

According to the 28th aspect of the invention, in the projection type display apparatus according to the 26th aspect, it is preferred that the nonreflecting portion is constituted as an indented portion formed at the surface facing opposite the entry surface.

According to the 29th aspect of the invention, in the projection type display apparatus according to the 26th aspect, it is preferred that the nonreflecting portion is constituted with a light absorbing member disposed at the surface facing opposite the entry surface.

According to the 30th aspect of the invention, in the projection type display apparatus according to the 26th aspect, it is preferred that there is further provided halfwave phase plates that are disposed in correspondence to the individual colors of light between the polarization beam splitters and the color composition optical system, and the analyzed light enters the color composition optical system as S polarized light.

DESCRIPTION OF THE PREFERRED EMBODIMENTS

Figure 1:
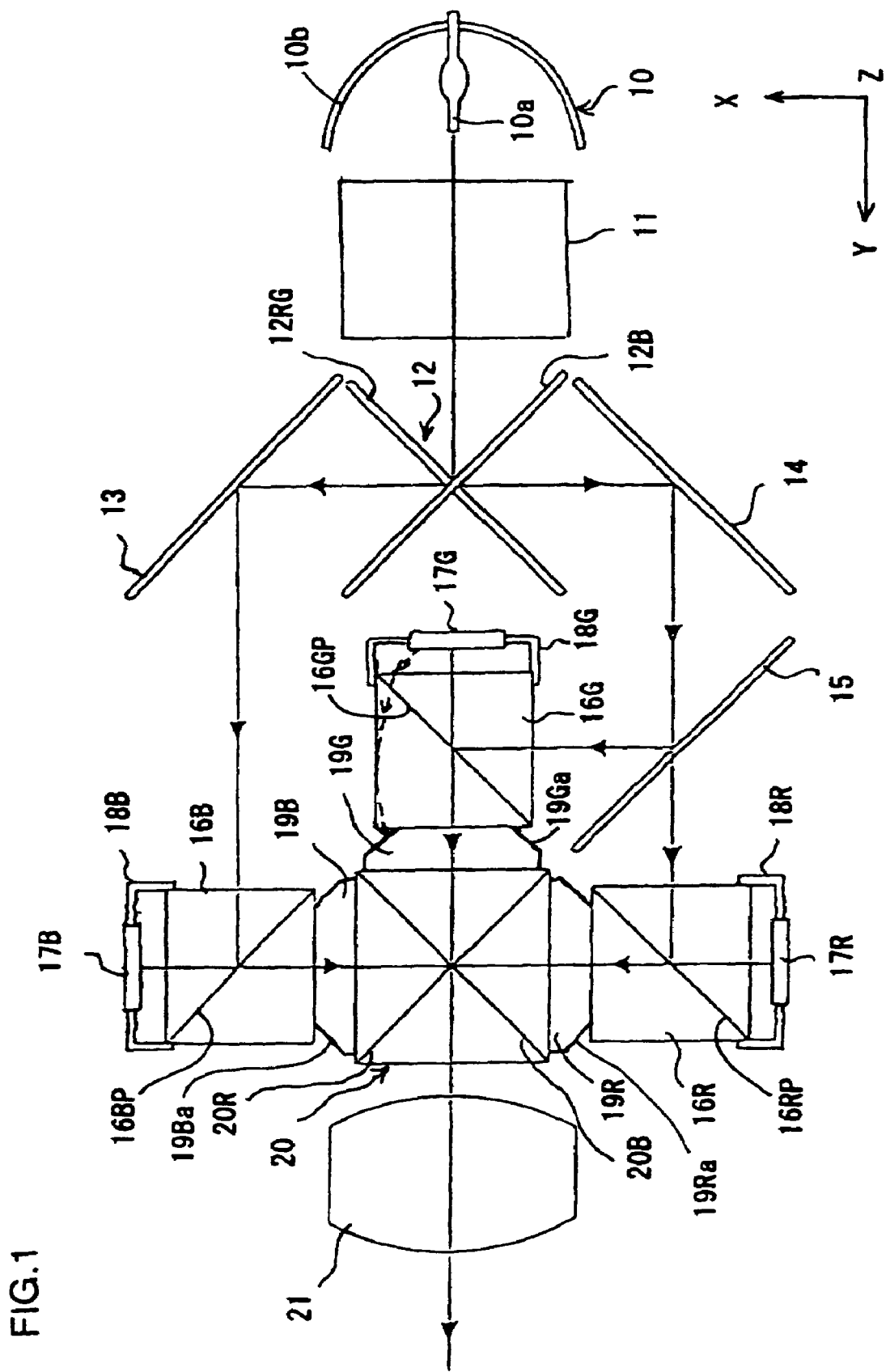
FIG. 1 is a schematic plan view of the structure adopted in a first embodiment of the projection type display apparatus according to the present invention.
Figure 2:
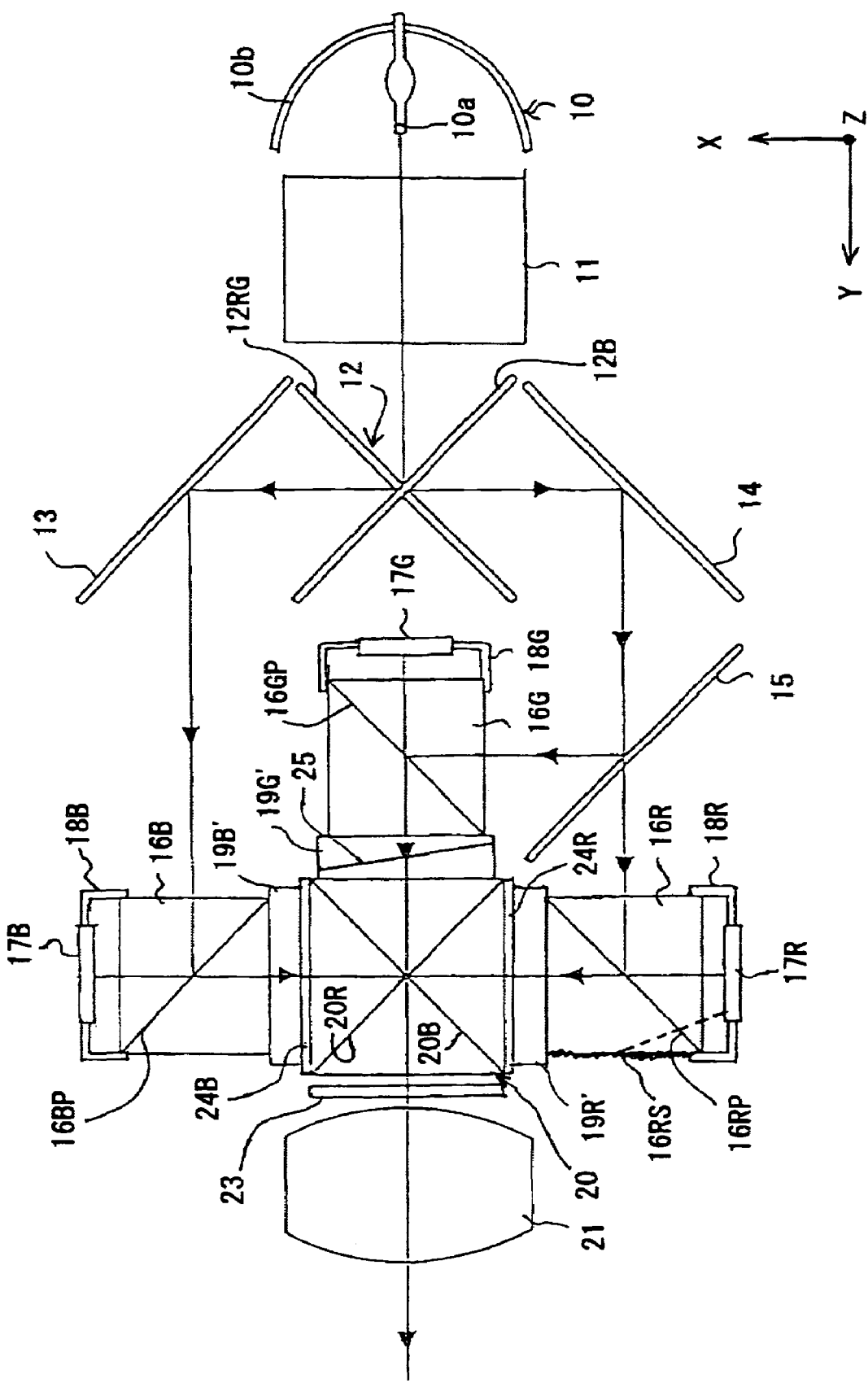
FIG. 2 is a schematic plan view of the structure adopted in a second embodiment of the projection type display apparatus according to the present invention.
Figure 3:
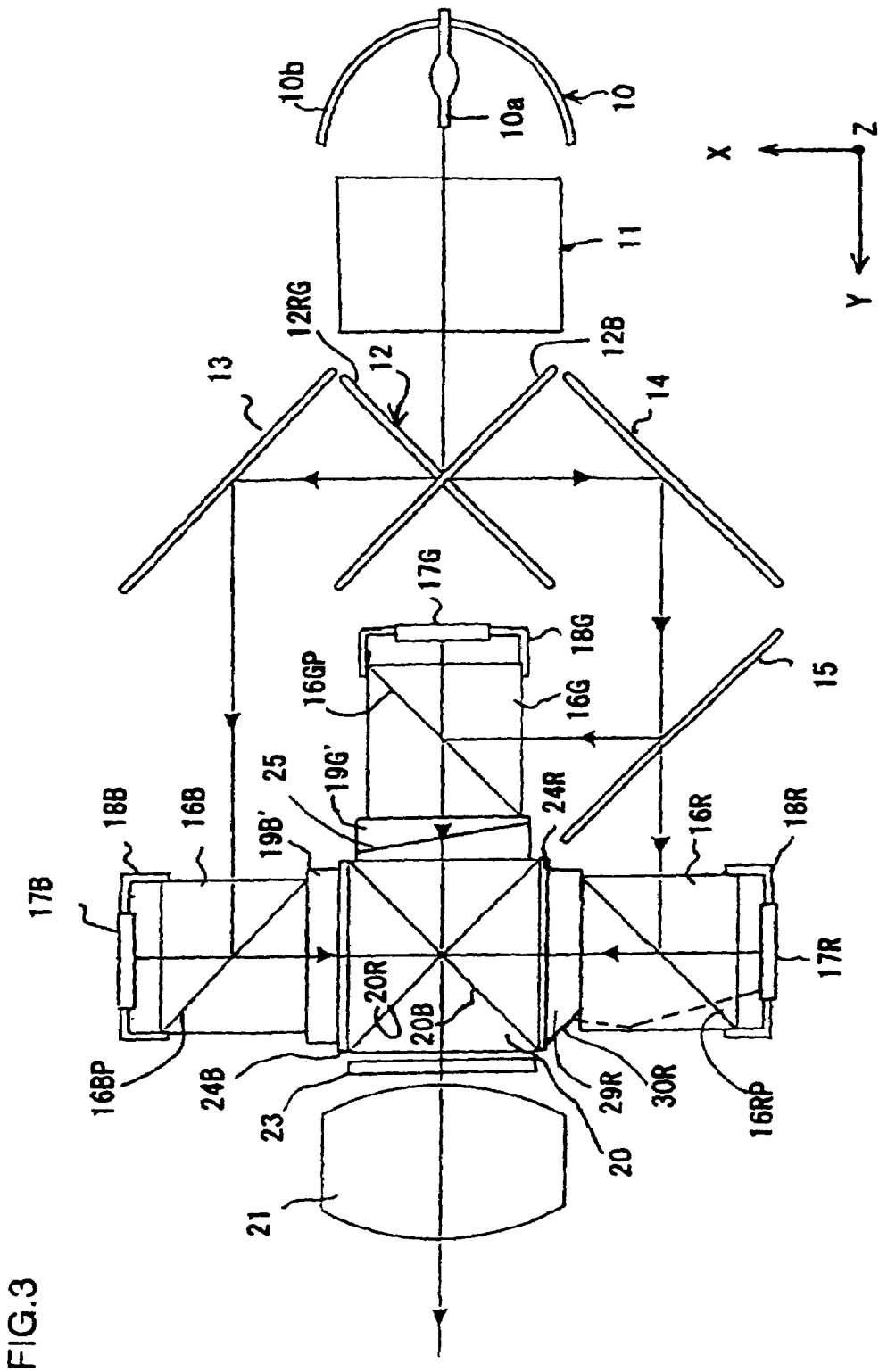
FIG. 3 is a schematic plan view of the structure adopted in a third embodiment of the projection type display apparatus according to the present invention.
Figure 4:
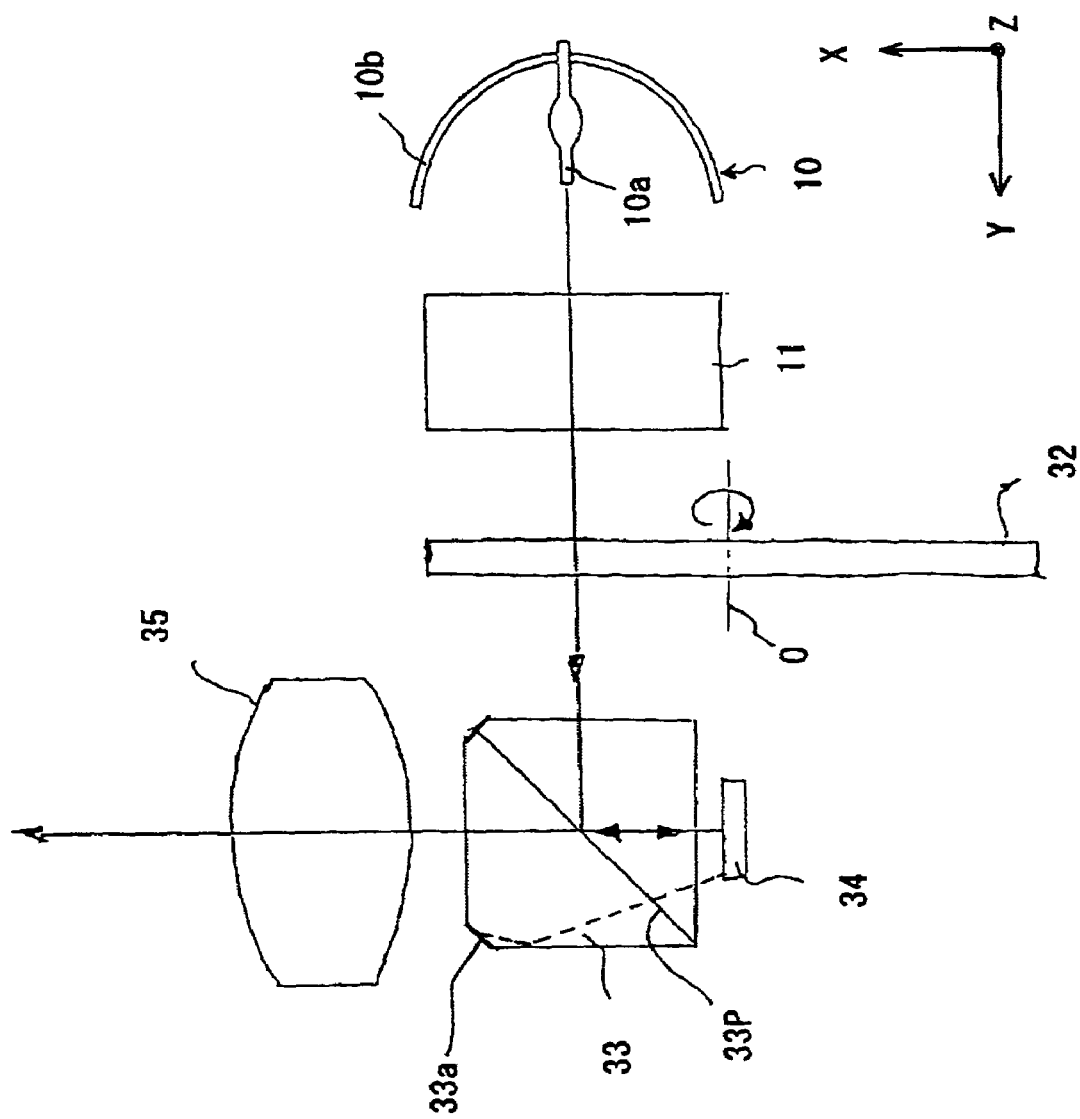
FIG. 4 is a schematic plan view of the structure adopted in a fourth embodiment of the projection type display apparatus according to the present invention.
Figure 5:
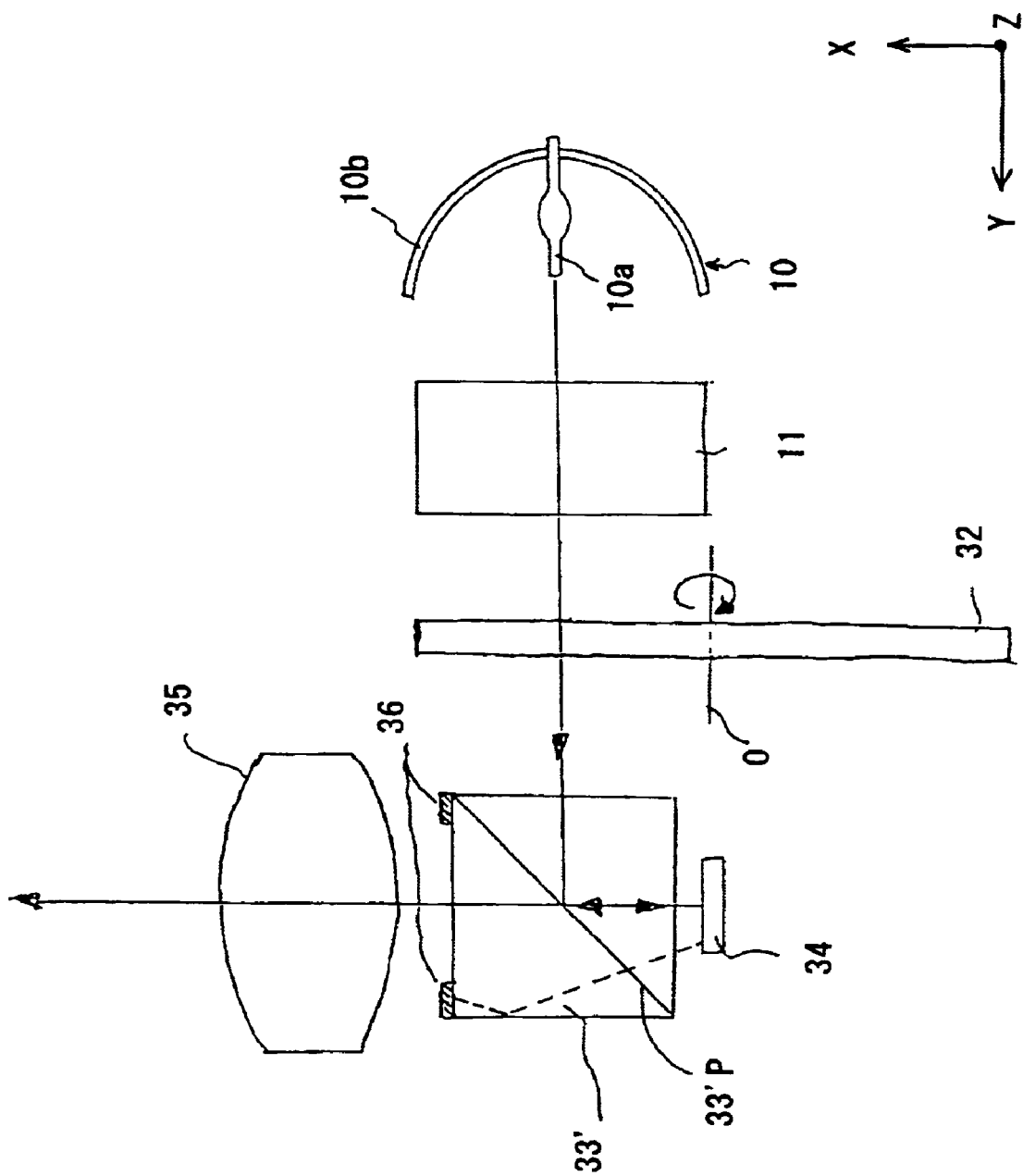
FIG. 5 is a schematic plan view of the structure adopted in a fifth embodiment of the projection type display apparatus according to the present invention.

The following is an explanation of the embodiments of the present invention, given in reference to the drawings. FIG. 1 is a schematic plan view showing the structure adopted in the first embodiment of the projection type display apparatus according to the present invention. FIG. 2 is a schematic plan view showing the structure adopted in the second embodiment of the projection type display apparatus according to the present invention. FIG. 3 is a schematic plan view showing the structure adopted in the third embodiment of the projection type display apparatus according to the present invention. FIG. 4 is a schematic plan view showing the structure adopted in the fourth embodiment of the projection type display apparatus according to the present invention. FIG. 5 is a schematic plan view showing the structure adopted in the fifth embodiment of the projection type display apparatus according to the present invention. In each of the figures, an X axis, a Y axis and a Z axis extending perpendicular to one another are defined. It is to be noted that the Z axis extends perpendicular to the drawing sheet surface.

First Embodiment

In FIG. 1, light emitted along the Y axis from a light source 10 constituted with a lamp 10a and a concave mirror 10b assuming a parabolic surface contour travels through a polarization conversion device 11 where it is converted to linearly polarized light vibrating along the Z axis perpendicular to the drawing sheet surface.

The light exiting the polarization conversion device 11 enters a cross dichroic mirror 12 which is achieved by disposing a dichroic mirror 12B having characteristics whereby blue color light (hereafter referred to as B light) is reflected and a dichroic mirror 12RG having characteristics whereby red color light (hereafter referred to as R light) and green light (hereafter referred to as G light) are reflected so that the dichroic mirrors intersect each other orthogonally and undergoes color separation to be separated into B light that advances along the X axis and mixed light containing R light and G light that advances along the −X axis.

The B light resulting from the color separation changes its advancing direction at a mirror 13 to advance along the Y axis and enters a polarization beam splitter 16B for B light. The mixed light containing the R light and the G light resulting from the color separation changes its advancing direction at a mirror 14 to advance along the Y axis, enters a dichroic mirror 15 disposed on the optical axis and having G light reflecting characteristics where it undergoes color separation to be separated into R light, which is transmitted through the dichroic mirror 15 and advances along the Y axis and G light, which is reflected at the dichroic mirror 15, changes its advancing direction and advances along the X axis, and the R light and the G light respectively enter polarization beam splitters 16R and 16G for R light and G light. The color separation optical system is thus achieved.

Since the B light, the G light and the R light entering the polarization beam splitters 16B, 16G and 16R have been polarized along the directions with which they are substantially reflected at polarization split portions 16BP, 16GP and 16RP (perpendicular to the XY plane and each forming an angle of approximately 45° relative to the incident light optical axis) (namely, they have been S polarized relative to the polarization split portions), they are reflected at the corresponding polarization split portions 16BP, 16GP and 16RP, exit the polarization beam splitters 16B, 16G and 16R and enter reflection type light valves 17B, 17G and 17R disposed so as to constitute integrated units together with the polarization beam splitters 16B, 16G and 16R by using integrating members 18B, 18G and 18R respectively.

The reflection type light valves 17B, 17G and 17R each modulate the incident light by using a corresponding color signal, i.e., a B light color signal, a G light color signal or an R light color signal, and emit reflected light (modulated light exits as P polarized light, whereas unmodulated light exits as the initial S polarized light). The B light, the G light and the R light having exited the corresponding light valves reenter the polarization beam splitters 16B, 16G and 16R respectively. The modulated light in the B light, the G light and the R light having reentered the polarization beam splitters is transmitted (analyzed) through the corresponding polarization split portions 16BP, 16GP and 16RP and then exits the polarization split portions. The B light, the G light and the R light having exited the polarization beam splitters 16B, 16G and 16R then travel through spacer members (e.g., glass substrates) 19B, 19G and 19R disposed between the exit planes at the polarization beam splitters 16B, 16G and 16R and entry planes of a cross dichroic prism 20 constituting the color composition optical system and enter the cross dichroic prism 20 through different entry planes.

The R light and the B light having entered the cross dichroic prism 20 are respectively reflected at an R light reflecting dichroic film 20R and a B light reflecting dichroic film 20B disposed inside the cross dichroic prism 20 so as to intersect each other orthogonally, the G light having entered the cross dichroic prism 20 is transmitted through the R light reflecting dichroic film 20R and the B light reflecting dichroic film 20B, the B light, the G light and the R light become combined, the composite light exits along the Y axis through the exit surface of the cross dichroic prism 20 and enters a projection lens 21 which then projects a full-color projected image onto a screen (not shown). The projection type display apparatus in the embodiment is achieved by adopting the structure described above.

In the first embodiment, the spacer members 19B, 19G and 19R comprise cut portions 19Ba, 19Ga and 19Ra formed by grinding off the peripheral corners at the surfaces thereof toward the polarization beam splitters 16B, 16G and 16R. The cut portions 19Ba, 19Ga and 19Ra are formed with a roughly ground finish (ground glass finish) so as to cause the light to scatter. As a result, the diffracted light (indicated with the dotted line in the figure) from the end portion of, for instance, the reflection type light valve 17G, which becomes ghost light in the related art, is caused to enter the polarization beam splitter 16G, is reflected at a side surface of the polarization beam splitter 16G, exits the polarization beam splitter 16G, enters and is scattered at the cut portion 19Ga of the spacer member 19G. Thus, it is not projected as ghost light through the projection lens 21. In addition, similar diffracted light beams exiting the reflection type light valves 17R and 17G for the other colors of light, i.e., R light and B light, too, are blocked at the cut portions 19Ra and 19Ba of the spacer members 19R and 19B adopting structures identical to that of the spacer member 19G, and thus, they are not projected as ghost light.

It is to be noted that a similar effect can be achieved by disposing a light absorbing member that absorbs incident light at the cut portions. In addition, the specific spacer member corresponding to a given color of light at which a cut portion must be formed should be determined based upon the conditions under which ghost light occurs, and such cut portions do not need to be formed in correspondence to all the colors of light, i.e., R light, B light and G light. It is to be noted that the term of "color of light" may be referred to as the term of "colored light".

While the cut portions are formed by grinding the corners of the spacer members in the embodiment, light blocking portions may be formed at the polarization beam splitters without grinding the spacer members. In such a case, the ghost phenomenon can be prevented equally effectively by disposing a light blocking member such as a light absorbing member at the periphery of the exit surface facing opposite the cut portion of the spacer member. As an alternative, the corners of the exit surfaces at the polarization beam splitters may be ground off as at the spacer members instead of providing light blocking members.

Second Embodiment

Next, the projection type display apparatus achieved in the second embodiment of the present invention is explained. The explanation is given by assigning the same reference numerals to components adopting structures similar to those in the first embodiment.

In FIG. 2, light emitted along the Y axis from a light source 10 constituted with a lamp 10a and a concave mirror 10b assuming a parabolic surface contour travels through a polarization conversion device 11 where it is converted to linearly polarized light vibrating along the Z axis perpendicular to the drawing sheet surface.

The light exiting the polarization conversion device 11 enters a cross dichroic mirror 12, which is achieved by disposing a dichroic mirror 12B having characteristics whereby B light is reflected and a dichroic mirror 12RG having characteristics whereby R light and G light are reflected so that the dichroic mirrors intersect each other orthogonally and undergoes color separation to be separated into B light, which advances along the X axis and mixed light containing R light and G light that advances along the −X axis.

The B light resulting from the color separation changes its advancing direction at a mirror 13 to advance along the Y axis and enters a polarization beam splitter 16B for B light. The mixed light containing the R light and the G light resulting from the color separation changes its advancing direction at a mirror 14 to advance along the Y axis, enters a dichroic mirror 15 disposed on the optical axis and having G light reflecting characteristics where it undergoes color separation to be separated into R light, which is transmitted through the dichroic mirror 15 and advances along the Y axis and G light, which is reflected at the dichroic mirror 15, changes its advancing direction and advances along the X axis, and the R light and the G light respectively enter polarization beam splitters 16R and 16G for R light and G light. The color separation optical system is thus achieved.

Since the B light, the G light and the R light entering the polarization beam splitters 16B, 16G and 16R have been polarized along the directions with which they are substantially reflected at polarization split portions 16BP, 16GP and 16RP (perpendicular to the XY plane and each forming an angle of approximately 45° relative to the incident optical axis) (namely, they have been S polarized relative to the polarization split portions), they are reflected at the corresponding polarization split portions 16BP, 16GP and 16RP, exit the polarization beam splitters 16B, 16G and 16R and enter reflection type light valves 17B, 17G and 17R disposed so as to constitute integrated units together with the polarization beam splitters 16B, 16G and 16R by using integrating members 18B, 18G and 18R respectively.

The reflection type light valves 17B, 17G and 17R each modulate the incident light by using a corresponding color signal, i.e., a B light color signal, a G light color signal or an R light color signal and emit reflected light (modulated light exits as P polarized light, whereas unmodulated light exits as the initial S polarized light). The B light, the G light and the R light having exited the corresponding light valves reenter the polarization beam splitters 16B, 16G and 16R respectively. The modulated light in the B light, the G light and the R light having reentered the polarization beam splitters is transmitted (analyzed) through the corresponding polarization split portions 16BP, 16GP and 16RP and then exits the polarization split portions.

Figure 7:
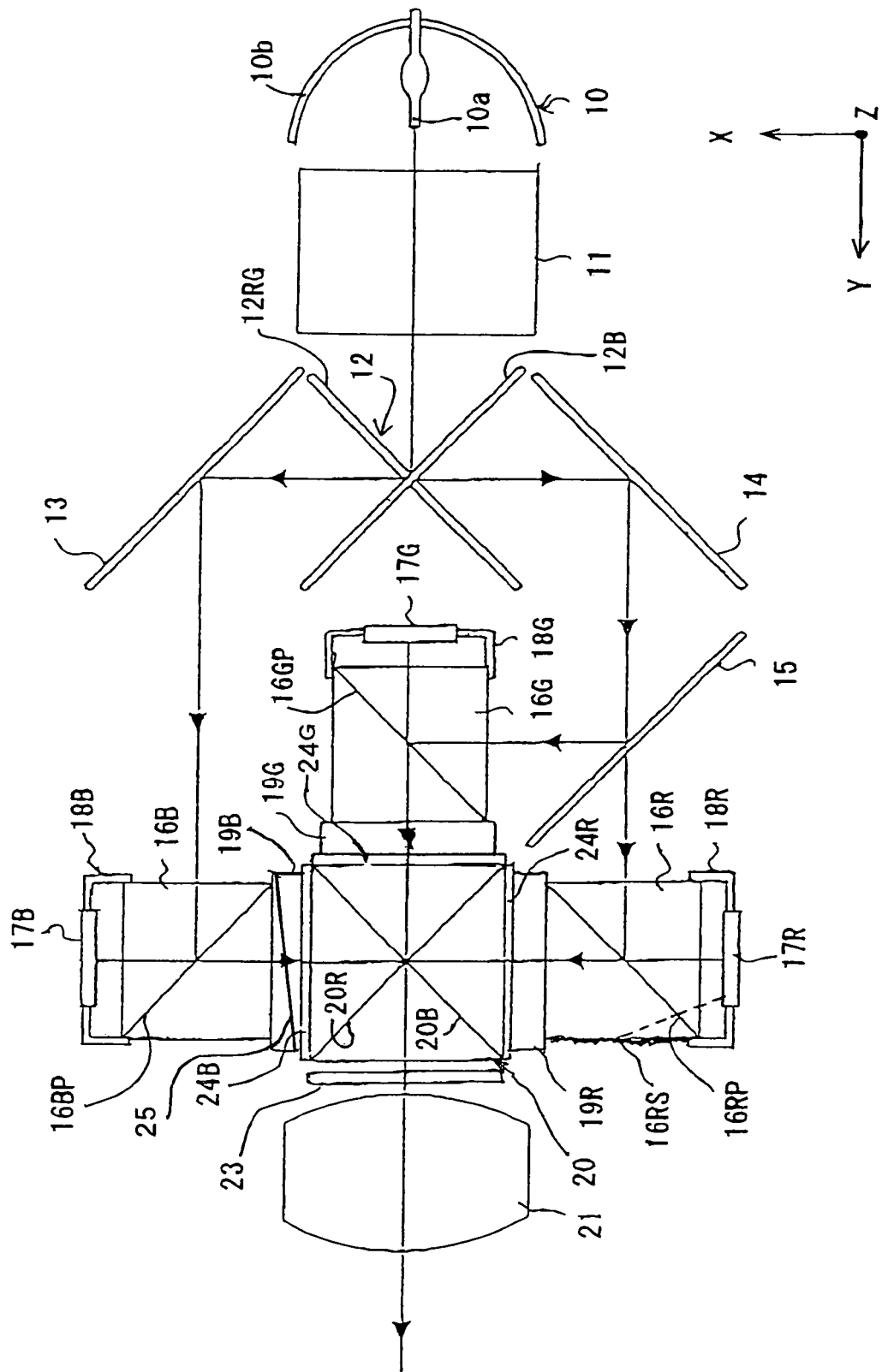
FIG. 7 is a schematic plan view of the structure adopted in a variation example of the second embodiment of the projection type display apparatus according to the present invention.

The R light and the B light respectively travel through halfwave phase plates 24R and 24B and spacer members 19R' and 19B' disposed between the exit surfaces of the polarization beam splitters 16R and 16B and the corresponding entry surfaces of a cross dichroic prism 20 constituting the color composition optical system, become converted to S polarized light and separately enter the dichroic prism 20. The G light, on the other hand, passes through a spacer member 19G' disposed between the exit surface of the polarization beam splitter 16G and the cross dichroic prism 20 and formed by tilting an R light reflecting dichroic film 25 relative to the optical axis and then enters the cross dichroic prism 20. It is to be noted that a halfwave phase plate 24G may be disposed in the optical path of the G light as shown in FIG. 7. In this case, the G light is converted to S polarized light and enters the cross dichroic prism 20. However, in this implementation, an R light reflecting dichroic film is not disposed in the spacer member 19G for the G light.

The R light and the B light having entered the cross dichroic prism 20 are respectively reflected at an R light reflecting dichroic film 20R and a B light reflecting dichroic film 20B disposed inside the cross dichroic prism 20 so as to intersect each other orthogonally, the G light having entered the cross dichroic prism 20 is transmitted through the R light reflecting dichroic film 20R and the B light reflecting dichroic film 20B, the B light, the G light and the R light become combined, the composite light exits along the Y axis through an exit surface of the cross dichroic prism 20 and enters a projection lens 21 via a quarterwave phase plate 23. The projection lens 21 then projects a full-color projected image onto a screen (not shown). The projection type display apparatus in the embodiment is achieved by adopting the structure described above.

The R light reflecting dichroic film 25 disposed inside the spacer member 19G' is explained. Light having been transmitted through the quarterwave phase plate 23 and reflected at a lens surface in the projection lens 21 is then retransmitted through the quarterwave phase plate 23 and becomes converted to P polarized light. R light in this P polarized light enters the dichroic prism 20 and a portion of the R light is transmitted through the R light reflecting dichroic film 20R to advance ahead. The transmitted R light is guided out of the optical path at the dichroic film 25. Namely, the R light having been transmitted through the dichroic film 20R exits the cross dichroic prism 20, is reflected at the dichroic film 25 and thus does not enter the polarization beam splitter 16G. Thus, no R light is allowed to enter the reflection type light valve 17G to become reflected and advance as ghost light to the projection lens 21 through the cross dichroic prism 20.

In case that the halfwave phase plate 24G is disposed in the optical path of the G light and the G light enters the color composition optical system as the S polarized light, following ghost light is generated. The R light exiting the reflection type light valve 17R for R light enters the cross dichroic prism 20 as the S polarized light. A portion of the R light is transmitted through the R light reflecting dichroic film 20R to advance toward the reflection type light valve 17B for B light, then is converted to P polarized light at the halfwave phase plate 24B, then is transmitted through the polarization split portion of the polarization beam splitter 16B, and then enters the reflection type light valve 17B for B light. The R light entering the reflection type light valve 17B for B light is reflected to advance in the reverse direction, then is transmitted through the polarization split portion of the polarization beam splitter 16B again, and then is converted to S polarized light at the halfwave phase plate 24B to enter the cross dichroic prism 20. A portion of the light entering the cross dichroic prism 20 is reflected at the B light reflecting dichroic film 20B of the cross dichroic prism 20 to enter the projection lens 21, and then becomes the ghost light.

R light, which is reflected at the reflection type light valve 17B for B light to enter the cross dichroic prism 20 again and then is transmitted through the B light reflecting dichroic film 20B, is reflected at the R light reflecting dichroic film 20R to advance toward the reflection type light valve 17G for G light, then becomes P polarized light at the halfwave phase plate 24G, then is transmitted through the polarization split portion of the polarization beam splitter 16G, and then enters the reflection type light valve 17G for G light. The R light entering the reflection type light valve 17G for G light is reflected to advance in the reverse direction, then is transmitted through the polarization split portion of the polarization beam splitter 16G again, and then is converted to S polarized light at the halfwave phase plate 24G for G light to enter the cross dichroic prism 20 again. A portion of the R light entering the cross dichroic prism 20 is transmitted through the dichroic films 20B and 20R to enter the projection lens 21, and then become the ghost light. In order to prevent the ghost light, by disposing and tilting the R light reflecting dichroic film 25 relative to the optical axis in the spacer member 19B, the R light which is transmitted through the cross dichroic prism 20 is reflected at the R light reflecting dichroic film 25 to be discarded out of the optical axis. As a result, unnecessary R light is prevented from entering the reflection type light valve 17B for B light.

In the second embodiment, a surface 16RS facing opposite the surface at which the R light resulting from color separation enters the polarization beam splitter 16R is formed with a roughly ground finish. Consequently, diffracted light (indicated by the dotted line in the figure) exiting, for instance, the reflection type light valve 17R for R light, which would become ghost light in the related art, enters the polarization beam splitter 16R, is reflected and is scattered at the roughly ground side surface 16RS in the second embodiment to ensure that it is not projected as ghost light through the projection lens 21.

If the side surface 16RS had a polished finish instead of a roughly ground finish, the diffracted light (indicated by the dotted line in FIG. 2) from the reflection type light valve 17R would be reflected at a side surface 16RS and a portion of the reflected light would be reflected at the B light reflecting dichroic film 20B of the cross dichroic prism 20 to advance toward the reflection type light valve 17G for G light. This R light would then enter the dichroic film 25 at the spacer member 19G', be reflected to reenter and exit the cross dichroic prism 20, and enter the projection lens 21 to be projected as ghost light. The phenomenon of such ghost light, too, can be prevented by forming the side surface 16RS with a roughly ground finish.

In addition, the light exiting, for instance, the reflection type light valve 17R, which enters the polarization beam splitter 16R, advances substantially parallel to the optical axis, is transmitted through the two dichroic films 20R and 20B in the cross dichroic prism 20 and exits the cross dichroic prism 20, then enters the polarization beam splitter 16B, is transmitted through the polarization beam splitter 16B, enters the reflection type light valve 17B, is reflected at the R light reflecting dichroic film 20R at the cross dichroic prism 20, is reflected at the R light reflecting dichroic film 25 in the spacer member 19G' to advance ahead, enters the polarization beam splitter 16R through the surface at which the analyzed light exits and enters the side surface 16RS near the analyzed light exit surface at the polarization beam splitter 16R from the inside. However, since the side surface is formed with a roughly ground finish, this light is scattered and thus, it is not projected through the projection lens 21 as ghost light.

If the side surface 16RS was not formed with a roughly ground finish, the R light reflected at the dichroic film 25 to reenter the polarization beam splitter 16R and then enter the side surface 16RS would be reflected at a side surface 16RS to advance through the polarization beam splitter 16R, enter the side surface facing opposite the side surface 16Rs, be reflected at the side surface, be reflected at the surface facing opposite the reflection type light valve 17R, reenter the side surface 16Rs, be reflected, exit the polarization beam splitter 16R, reenter the dichroic film 25 in the spacer member 19G', be reflected at the dichroic film 25 and be transmitted through the cross dichroic prism 20 to enter the projection lens 21. Such R light might be projected as ghost light.

It is to be noted that a similar effect can be achieved by disposing a light absorbing member that absorbs incident light at the side surface 16RS of the polarization beam splitter 16R, as well.

While ghost light resulting from diffracted light exiting the reflection type light valve 17R for R light, which is reflected at a side surface 16RS of the polarization beam splitter 16R, is reflected at the dichroic film 20B in the cross dichroic prism 20 and is reflected at the dichroic film 25 in the spacer member 19G', is prevented by adopting the embodiment, light other than this diffracted light may be prevented from becoming ghost light according to the present invention. It goes without saying that the present invention may be adopted to prevent the phenomenon of ghost light resulting from diffracted light exiting the reflection type light valves 17R, 17G and 17B provided in correspondence to the individual colors of light, which then enters the corresponding polarization beam splitters, is reflected at the surfaces facing opposite the surface through which the light in the specific colors resulting from the color separation has entered, exits the polarization beam splitter to advance ahead, enters the cross dichroic prism 20 where R light is reflected at the dichroic film 20R, B light is reflected at the dichroic film 20B, G light is transmitted through the two films to advance ahead and the R light, the B light and the G light thus undergo color composition to enter the projection lens as composite light. The advantage of the present invention may be achieved by forming side surfaces of the other polarization beam splitters 16G and 16B facing opposite the entry surfaces through which the individual colors of light resulting from the color separation enter with a roughly ground finish as well as the side surface at the R light polarization beam splitter 16R or by providing a light absorbing member at the side surfaces of the polarization beam splitter 16G and 16B as well as the side surface at the R light polarization beam splitter 16R.

Figure 6:
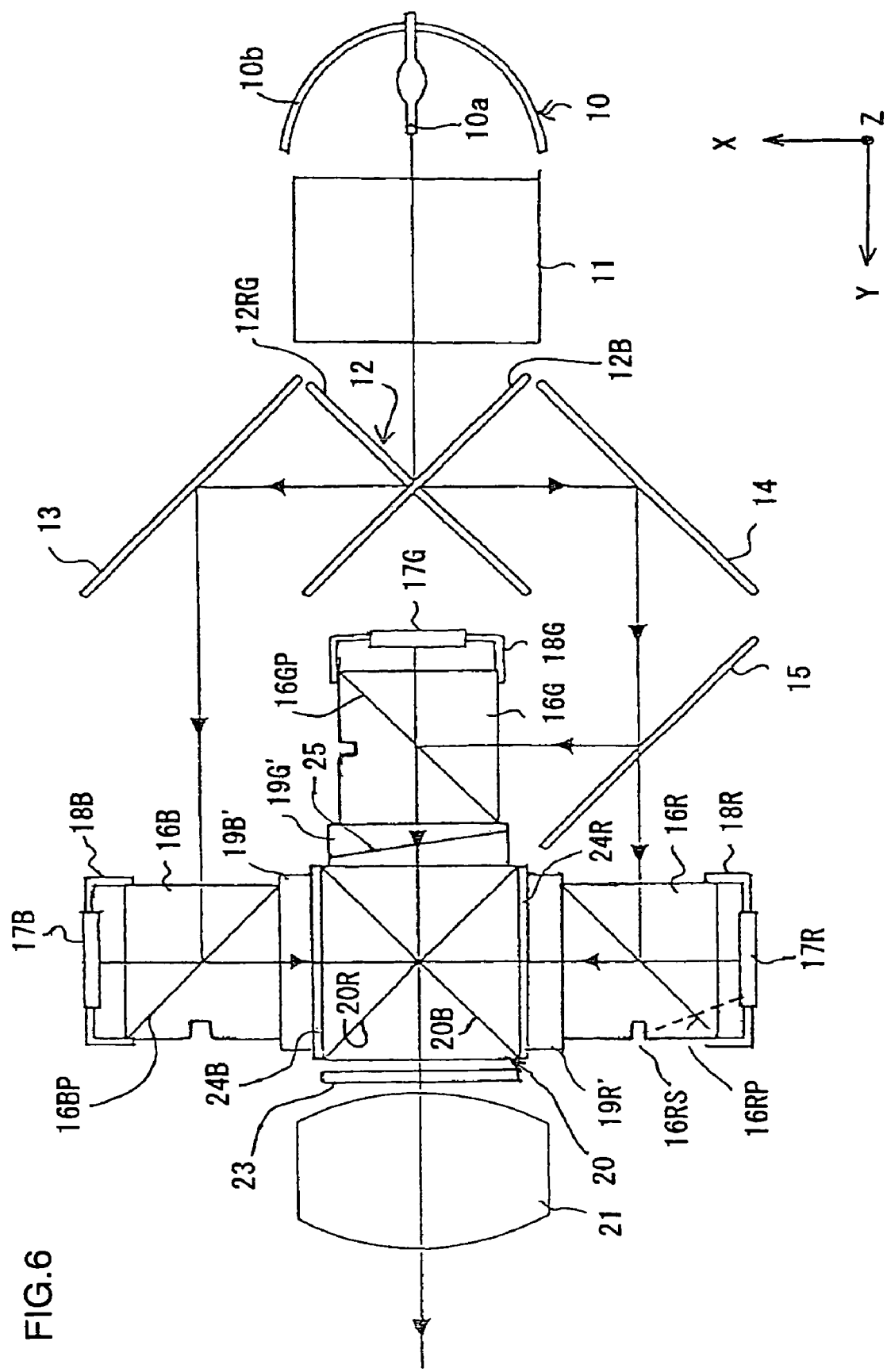
FIG. 6 is a schematic plan view of the structure adopted in a variation example of the second embodiment of the projection type display apparatus according to the present invention.

Alternatively, as shown in FIG. 6, an indented portion may be formed at the side surface 16RS facing opposite the entry surface of the polarization beam splitter. This indented portion should be formed at the side surface 16RS of the polarization beam splitter 16R along the direction perpendicular to the drawing sheet surface. The size of the indented portion should be determined in correspondence to the size of the polarization beam splitter 16R and the diameter of the light flux exiting the reflection type light valve 17R. At the indented portion formed at the side surface 16Rs, as described above, light entering the side surface 16RS is scattered and thus it does not become ghost light projected through the projection lens 21. It is to be noted that a similar effect may be achieved by forming a similar indented portion at the side surfaces of the polarization beam splitters 16G and 16B for the other colors of light as well as at the side surface of the R light polarization beam splitter 16R.

Third Embodiment

Next, the projection type display apparatus achieved in the third embodiment of the present invention is explained. The same reference numerals are assigned to components adopting structures similar to those in the second embodiment to preclude the necessity for a repeated explanation thereof.

In FIG. 3, the R light and the B light respectively travel through halfwave phase plates 24R and 24B and spacer members 29R and 19B' disposed between the exit surfaces of the polarization beam splitters 16R and 16B and the corresponding entry surfaces of a cross dichroic prism 20 constituting the color composition optical system, and separately enter the dichroic prism 20. The G light, on the other hand, passes through a spacer member 19G' disposed between the exit surface of the polarization beam splitter 16G and the cross dichroic prism 20 and formed by tilting an R light reflecting dichroic film 25 relative to the optical axis and then enters the cross dichroic prism 20. Since other structural features and functions are similar to those of the second embodiment, their explanation is omitted.

The spacer member 29R in the third embodiment forms a cut portion 30R at a side surface thereof facing opposite the entry surface through which the R light resulting from the color separation enters the polarization beam splitter 16R, on the outer edge toward the polarization beam splitter 16R. The cut portion 30R is formed with a roughly ground finish. As a result, diffracted light (indicated with the dotted line in the figure) exiting, for instance, the reflection type light valve 17R for R light, which would become ghost light in the related art after entering the polarization beam splitter 16R, being reflected at a side surface thereof, exiting the polarization beam splitter 16R through the exit surface and entering the cut portion 30 at the spacer member 29, is instead scattered at the cut portion 30R with a roughly ground finish. Thus, the phenomenon of ghost light is prevented, as in the preceding embodiments.

In addition, a portion of the R light exiting the reflection type light valve 17R for R light, which would then be transmitted through the dichroic films 20R and 20B at the cross dichroic prism 20, enter the reflection type light valve 17B for B light, be reflected at the reflection type light valve 17B for B light, be reflected at the dichroic film 20R in the cross dichroic prism 20, enter the spacer member 19G', be reflected at the R light reflecting dichroic film 25, reflected at the dichroic film 20R in the cross dichroic prism 20 again and enter the polarization beam splitter 17R through the analyzed light exit surface, is instead scattered at the cut portion 30R with a roughly ground finish at the spacer member 29R. As a result, the light does not enter the polarization beam splitter 17R through the analyzed light exit surface and ultimately does not enter the projection lens 21 as ghost light.

It is to be noted that a similar effect can be achieved by disposing a light absorbing member that absorbs incident light at the cut portion 30R, as well. Also, the halfwave phase plate 24G may be disposed in the spacer members 19B as shown in the second embodiment.

Fourth Embodiment

Next, the projection type display apparatus achieved in the fourth embodiment of the present invention is explained.

In FIG. 4, light emitted along the Y axis from a light source 10 constituted with a lamp 10a and a concave mirror 10b assuming a parabolic surface contour travels through a polarization conversion device 11 where it is converted to linearly polarized light vibrating along the Z axis perpendicular to the drawing sheet surface.

The light having exited the polarization conversion device 11 enters a time-series color separation optical system 32 and undergos color separation to be separated into R light, G light and B light in time series (time domain). The individual colors of light then exit the time-series color separation optical system 32 in time series. The time-series color separation optical system 32 is constituted by disposing three different types of filters used to extract R light, G light and B light transmitted through them at a substantially disk-shaped member that rotates around a central axis O over substantially uniform intervals along the circumference.

The different colors of light resulting from the color separation at the time-series color separation optical system 32 enter a polarization beam splitter 33 along a single optical axis, are reflected at a polarization split portion 33P, exit the polarization beam splitter 33, enter a reflection type light valve 34 in time series, undergo the process of modulation achieved by using color signals corresponding to the individual colors of light at the reflection type light valve 34, are reflected and reenter the polarization beam splitter 33. The modulated light resulting from the modulation at the reflection type light valve 34 corresponding to the individual colors having entered the polarization beam splitter 33 is analyzed and extracted as transmitted light transmitted through the polarization split portion 33P and the extracted light is then allowed to enter the projection lens 35 to be projected in an enlargement onto a screen (not shown). The projection type display apparatus in the embodiment is achieved by adopting the structure as described above.

The polarization beam splitter 33 used in the fourth embodiment forms a cut portion (chamfered portion) 33a at the outer edges of the exit surface through which the light having been analyzed at the polarization split portion 33P exits, and the surface of the cut portion 33a has a roughly ground finish. As a result, diffracted light (indicated by the dotted line in the figure) from, for instance, the reflection type light valve 34, which would become ghost light in the related art after entering the polarization beam splitter 33, being reflected at a side surface of the polarization beam splitter 33 to advance ahead and exiting through the exit surface, is instead scattered at the cut portion 33a and thus, the light is not projected through the projection lens 35 as ghost light.

It is to be noted that a light absorbing member may be disposed at the beveled portion 33a to achieve a similar effect by absorbing the light which would become ghost light. In addition, as in the second embodiment, a light blocking portion may be disposed at a surface of the polarization beam splitter facing opposite the surface through which color light from the time-series color separation optical system enters to achieve a similar effect.

Fifth Embodiment

Next, the projection type display apparatus achieved in the fifth embodiment of the present invention is explained. The projection type display apparatus in the fifth embodiment differs from the projection type display apparatus in the fourth embodiment in that a member that cuts off ghost light is provided at the exit surface of the polarization beam splitter, and for this reason, the same reference numerals are assigned to components identical to those in the fourth embodiment to preclude the necessity for a repeated explanation thereof.

FIG. 5 shows light blocking members 36 disposed at the outer edges of the exit surface through which the light having been analyzed at a polarization split portion 33'P of a polarization beam splitter 33' exits so as to cut off ghost light. Thus, diffracted light (indicated by the dotted line in the figure) exiting the reflection type light valve 34, for instance, that would become ghost light in the related art after entering the polarization beam splitter 33', being reflected at a side surface of the polarization beam splitter 33' to advance ahead and exiting the exit surface of the polarization beam splitter 33' is instead cut off at the light blocking members 36, and ultimately, it is not projected through the projection lens 35 as ghost light.

It is to be noted that the light blocking members 36 may be light absorbing members that absorb light or they may be metal plate members or organic members having surfaces thereof formed with a roughly ground finish so as to scatter light.

By adopting any of the embodiments described above, it becomes possible to cut superfluous light that would become ghost light and thus to provide a projection type display apparatus in which projection of ghost light is prevented.

The above described embodiments are examples, and various modifications can be made without departing from the spirit and scope of the invention.

What is claimed is:

1. A projection type display apparatus, comprising:
   a reflection type light valve;
   a polarization beam splitter that emits light obtained through polarization split executed thereat on light from a light source toward the reflection type light valve, analyzes light modulated at the reflection type light valve and includes a light blocking portion that is formed by cutting off a corner and is disposed near an outer edge of an exit surface through which the analyzed modulated light exits; and
   a projection lens through which the analyzed modulated light is projected.

2. A projection type display apparatus according to claim 1, wherein:
   a surface of the light blocking portion is processed so as to achieve a light scattering state.

3. A projection type display apparatus, comprising:
   a reflection type light valve;
   a polarization beam splitter that light modulated at the reflection type light valve enters and that includes a light blocking portion disposed near an exit surface from which an analyzed modulated light exits; and
   a projection lens through which the analyzed modulated light is projected,
   wherein the light blocking portion is provided at a spacer member that is constituted with glass and is disposed near the exit surface.

4. A projection type display apparatus, comprising:
   a reflection type light valve;
   a polarization beam splitter that light modulated at the reflection type light valve enters and from which an analyzed modulated light exits;
   a light blocking portion blocking light that is reflected at a side surface of the polarization beam splitter, the light blocking portion disposed near an exit surface from which the analyzed modulated light exits, wherein the light is a part of light being modulated at the reflection type light valve and entering the polarization beam splitter; and
   a projection lens through which the analyzed modulated light is projected.

5. A projection type display apparatus according to claim 4, wherein:
   the light blocking portion comprises a light absorbing member.

6. A projection type display apparatus according to claim 4, wherein:
   a surface of the light blocking portion is processed so as to achieve a light scattering state.

7. A projection type display apparatus according to claim 4, wherein:

the light blocking portion is formed by cutting off a corner near the outer edge of the exit surface at the polarization beam splitter.

8. A projection type display apparatus according to claim 4, further comprising:
a spacer member that is disposed near the exit surface.

9. A projection type display apparatus according to claim 8, wherein:
the spacer member includes the light blocking portion on a portion facing the polarization beam splitter.

10. A projection type display apparatus, comprising:
a reflection type light valve;
a polarization beam splitter that light modulated at the reflection type light valve enters and that includes a light blocking portion disposed near an exit surface from which an analyzed modulated light exits; and
a projection lens through which the analyzed modulated light is projected,
wherein the light blocking portion is formed by cutting off a corner near an outer edge of the exit surface at the polarization beam splitter.

11. A projection type display apparatus according to claim 10, wherein:
the light blocking portion is formed to achieve light scattering.

* * * * *